United States Patent [19]

Haber et al.

[11] Patent Number: 5,375,165
[45] Date of Patent: Dec. 20, 1994

[54] COMPUTER KEYBOARD HAVING BOTH A STANDARD KEYBOARD MODE AND A TELEPHONE CONTROL MODE

[76] Inventors: Alan P. Haber; Roy J. Saslow, both of P.O. Box 23047, Jerusalem, Israel, 91230

[21] Appl. No.: 68,720
[22] Filed: May 27, 1993

Related U.S. Application Data

[63] Continuation-in-part of Ser. No. 972,079, Nov. 5, 1992, abandoned, which is a continuation of Ser. No. 567,403, Aug. 14, 1990, abandoned.

[51] Int. Cl.$^5$ ............................................. H04M 11/00
[52] U.S. Cl. ...................................... 379/90; 341/22; 364/705.05
[58] Field of Search ................... 379/90, 96–98, 379/100, 110, 428, 440–442, 447; 364/705.05, 705.01, 709.01; 358/401; 341/22, 34; 395/500; 345/168, 169

[56] References Cited

U.S. PATENT DOCUMENTS

| | | | |
|---|---|---|---|
| 3,865,994 | 2/1975 | Bender | 379/110 |
| 4,503,288 | 3/1985 | Kessler . | |
| 4,533,791 | 8/1985 | Read et al. . | |
| 4,578,537 | 3/1986 | Faggin et al. . | |
| 4,672,459 | 6/1987 | Kudo | 358/257 |
| 4,731,667 | 3/1988 | Watanabe et al. | 358/256 |
| 4,736,407 | 4/1988 | Dumas | 379/96 |
| 4,739,316 | 4/1988 | Yamaguchi et al. | 340/711 |
| 4,752,808 | 6/1988 | Lemelson | 355/14 R |
| 4,759,053 | 7/1988 | Satomi et al. | 379/100 |
| 4,802,204 | 1/1989 | Chang | 379/100 |
| 4,827,085 | 5/1989 | Yaniv et al. | 178/18 |
| 4,829,959 | 5/1989 | Izawa et al. | 379/96 |
| 4,839,919 | 6/1989 | Borges et al. | 379/96 |
| 4,849,815 | 7/1989 | Streck | 379/100 |
| 4,850,008 | 7/1989 | Berg et al. | 379/93 |
| 4,860,342 | 8/1989 | Danner | 379/96 |
| 4,864,601 | 9/1989 | Berry | 379/96 |
| 4,873,715 | 10/1989 | Shibata | 379/93 |
| 4,878,242 | 10/1989 | Springer et al. | 379/204 |
| 4,885,580 | 12/1989 | Noto et al. | 341/23 |
| 4,908,851 | 3/1990 | Kontani et al. | 379/100 |
| 4,916,732 | 4/1990 | Kotami et al. | 379/110 |
| 4,918,723 | 4/1990 | Iggulden et al. | 379/100 |
| 4,922,524 | 5/1990 | Baba et al. | 379/100 |
| 4,991,197 | 2/1991 | Morris | 379/58 |
| 5,197,147 | 3/1993 | Long et al. | 395/500 |
| 5,253,940 | 10/1993 | Abecassis | 379/110 |

OTHER PUBLICATIONS

Cutler, C. C., "Displayphone: An Interactive Graphical Communication Experiment", *Electronic Text Communication Conference*, Munich, Germany Jun. 12–15 1978 (pp. 323–328).
Durkin, G. M., "QWERTYphone —A Low-Cost Integrated Voice/Data Terminal", *British Telecommunications Engineering*, vol. 5, Jan. 1987 (pp. 276–280).
"Executel", *British Telecommunications Engineering*, vol. 3, Jul. 1984 (back cover).
Grantham, George, "Meridian M4020: Integrated terminal for today and tomorrow", *Telesis 1985 two*, Second Quarter 1985 (Bell Northern Research Ltd. [Canada]) (pp.4–11).
Holmes, S. P., "Merlin Tonto", *British Telecommunications Engineering*, vol. 5, Jan. 1987 (pp. 273–275).
"Plessey MICROphone: Linking the World", *Plessey*, The Plessey JCompany, 1987 (6 pages).
"WORKSTATION", *Telephony*, Dec. 2, 1985, vol. 209, No. 23 (pp. 5 and 82).

*Primary Examiner*—Wing F. Chan
*Attorney, Agent, or Firm*—Peter L. Michaelson

[57] ABSTRACT

A computer peripheral device (200) including a conventional keyboard (201) and a telephone controller (320) for interconnecting an incoming telephone line (221) with a telephone instrument (235). Besides the standard array of keys (e.g. 205), the keyboard includes telephone control keys (e.g., 206, 207). A keyboard controller (310) is responsive to both the standard keys and the telephone keys to decode keyboard scan codes. The telephone keys cause a pre-determined keyboard area to operate in either a standard mode or a telephone mode. The keyboard controller transmits a synchronous serial data stream to the computer when operating in the standard mode. Alternatively, the keyboard controller transmits parallel control data to the telephone controller to control the set-up, interconnection, and takedown of the telephone line to the telephone instrument when the keyboard is placed in the telephone mode.

18 Claims, 8 Drawing Sheets

COMPUTER KEYBOARD HAVING BOTH A STANDARD KEYBOARD MODE AND A TELEPHONE CONTROL MODE

CROSS-REFERENCE TO RELATED APPLICATIONS

This is a continuation-in-part application of our co-pending U.S. patent application Ser. No. 07/972,079, filed on Nov. 5, 1992, now abandoned which itself is a continuation application of our U.S. patent application Ser. No. 07/567,403 filed Aug. 14, 1990, which is now abandoned.

BACKGROUND OF THE DISCLOSURE

1. Field of the Invention

This invention relates to both a personal computer keyboard and a telecommunications instrument such as a telephone and, more particularly, to circuitry combining the functionality of the keyboard and the instrument for autonomous but interactive operation of the circuitry with the personal computer.

2. Description of the Prior Art

Personal computers (PCs) are used within an office or home environment for numerous, diverse tasks such as word processing, storage/retrieval of information from data bases, and order entry. Most personal computers receive input information originated by a typewriter-like keyboard. Each key on the keyboard that is stroked (either depressed or released) is translated to an electrical signal which, in turn, is communicated from the keyboard to the PC over a cable linking the keyboard with a specific keyboard input/output (I/O) port in the PC. Typically software loaded into the PC processes the information in a pre-programmed manner to control operation of the PC, such as by displaying the letters/numbers associated with the keystrokes on a video monitor or directing output data to a printer.

Other types of input devices, such as a mouse or light pen, may be utilized in some applications. However, in many situations, such as the entry of textual data, a typewriter keyboard is the most efficient form of providing input information. Moreover, many persons who utilize a PC in their work endeavors are frequently required to use a telephone in conjunction with, and even simultaneously with, their use of the keyboard. Telephone order takers, service bureau personnel, and operators exemplify such persons.

Conventionally, the telephone functionality and the keyboard functionality, while being co-located for accessibility by a single user, have been provided as separate, stand-alone functions. For instance, a traditional telephone instrument, composed of a handset and a base with keypad, is located proximate to the PC and especially adjacent to the keyboard; with this arrangement, a PC user may concurrently utilize the telephone instrument and the keyboard. However, the telephone instrument and the PC, including the keyboard, are electronically independent. For example, while a standard keyboard has a numerical keypad area which has a layout similar to a telephone DTMF (Dual Tone Multi-Frequency) keypad, such a numerical keypad area had conventionally never been exploited as a telephone dialer.

Recently, system developers and designers have realized the shortcomings, especially the redundancies, of separately providing keyboard and telephone functionalities, so there have been numerous disclosures of techniques for electronically integrating these capabilities.

One disclosure representative of art in this area of technology is U.S. Pat. No. 4,860,342 (issued to Danner on Aug. 22, 1989—hereinafter referred to as "Danner"). With reference to FIG. 1 herein (which is a high-level rendition of Danner's FIG. 2), there is shown system 100 for integrating telephone functionality with a PC. In particular, PC 110 serves as an interface between keyboard 120 and telephone controller 130. In turn, telephone controller 130, when activated, serves to couple incoming telephone line 132 with telephone handset/headset 135 via telephone cord 136. To paraphrase the description of Danner (particularly, column 4, lines 29'66), when the user desires to use telephone instrument 135, e.g. To initiate a telephone call, the user may depress a predetermined key on keyboard 120. Keyboard controller 121, which is a major sub component of keyboard controller 120, electronically generates and then communicates a signal indicative of the key depression activity to PC 110 via keyboard-PC cable 111; the electronic signal representative of the keyboard depression is received at PC 110 via keyboard I/O port 113. PC 110 interprets the key depression using a pre-programmed application routine executing in CPU 112 as a request to utilize telephone instrument 135. Control is then switched from the application routine to a pre-programmed control routine to interpret keystrokes which presumably will be transmitted from keyboard 120. Telephone interface circuitry 114 within PC 110 is also activated and transmits, via telephone cable 131 connected to telephone port 115, a specified activation signal to telephone controller 130. Telephone element 135 is then bridged to incoming telephone line 132, which is a standard telephone line from a switched network, such as provided by a public or private exchange access server. After the telephone connection has been established, inputs received by PC 100 from keyboard 120 are interpreted as normal telephone dialing commands, hold commands, or other telephonically related commands, rather than inputs or instructions to the application routine which was previously executing.

As further disclosed by Danner, the signals needed to execute the telephone interface control repertoire are stored in a portion of a memory (not shown) associated with the PC which is not utilized by normal application programs operating on PC 110. Consequently, when the user has completed entering the commands to the telephone portion of the PC, program control is returned to the application program which was previously executing. The application program generally does not realize that control has been wrested from it and processing of the application program will continue as if never interrupted. Meanwhile, the telephone link previously established remains activated, and conversation can continue even though PC 110 has returned to its normal mode of accepting standards-interpreted input from keyboard 120.

When the user desires to terminate or change the established telephone connection, the user may again invoke the telephone function by entering another special keystroke on keyboard 120, whereupon the telephone function software resumes control of PC 110 while the change in the telephonic function is implemented. This process of switching between application program and telephone control routine can continue indefinitely.

One other elucidating reference that relates to the system integration of both keyboard and telephone functionalities is the article entitled "Meridian M4020: Integrated terminal for today and tomorrow", authored by G. Grantham and published in the *Telesis*, Vol. 2, 1985 (hereinafter referred to as "Grantham"). The M4020 terminal is basically a terminal that integrates voice, text, graphics, and image capabilities into one desktop workstation. The M4020 terminal incorporates a telephone set in a base as well as a keyboard for inputting alphanumeric information, including dialing digits. However, telephone call set-ups and take-downs are not handled locally, but rather through a remotely located host processor via messages which are transferred over a Local Area Network (LAN) link. When the user lifts the handset, for example, a digital off-hook message is sent to the remote host over the LAN link. The host makes the connection internal to the host and then a message is sent to the M4020 terminal to turn on dial tone. As the telephone number is keyed on the local keyboard, the digital equivalent is sent to the host, again over the LAN link. The host, in turn, makes the connection to the public switched telephone network, and the host sends a message to notify the M4020 terminal to turn on a local speaker/microphone. The user can now hear the called party ringing signal, and the call proceeds as normal from this point. When the user hangs up, the host sends a message to the M4020 terminal clearing the previous call.

Perusal of the prior art which is represented by the above references leads to the realization that communication between the keyboard and the telephone circuitry is effected by an interposed PC or host. In the case of Danner, and similarly in Grantham, hardware and/or software routines are implemented to interrupt normal application programs to process incoming electrical signals emanating from or homing on the keyboard and to send control signals to the telephone circuitry. Thus, the interoperability of the keyboard and telephone circuitry is strictly dependent upon the interposed PC; moreover, the PC must typically be arranged with additional software and circuitry, including a telephone port to link to the external telephone controller. Thus, it is clear that the combined functionality of the keyboard and the telephone service is not independent of the PC; in fact, the PC must be powered on and executing properly to effect combined keyboard-telephone functionality. These requirements impose a severe limitation in that the desired utility of the combined functionality is totally dependent upon the operational status of the PC as well as especial adaptation or augmentation of PC hardware and software to bring about the desired combined functionality.

Thus, a need exists in the art for an autonomous arrangement which combines the functionality of the keyboard with a telephone instrument so that the arrangement may operate independently of the PC, that is, the PC need not be specially adapted to provide for the combined functionality. In a broader context, the keyboard arrangement should be locally autonomous, that is, able to function on a stand-alone basis without the intervention of a remotely located host or master processor. In addition, to offer completely independent operation, the autonomous arrangement should not even necessarily rely upon the PC for its source of power, particularly during outages of the PC.

SUMMARY OF THE INVENTION

These limitations and other shortcomings and deficiencies are obviated, in accordance with the present invention, by an autonomous keyboard peripheral device which combines the functionality of both the keyboard and telephone circuitry.

Broadly, the keyboard peripheral device includes a conventional keyboard and the device is electronically arranged to separately terminate an incoming telephone line and a standard telephone instrument. The line and instrument may then be interconnected within the device to effect normal telephone communication such as human conversation. In addition to a standard array of keys, the keyboard includes telephone control keys. A keyboard controller, which is responsive to the standard array of keys to decode keyboard scan codes, is further adapted so as to decode and interpret the functionality assigned to these telephone control keys. The telephone control keys also control a specified keyboard area, including the numerical keypad area, to operate in two alternative modes, namely, a standard keyboard mode and a telephone call mode. The keyboard controller responds to keyboard scan codes while in the standard keyboard mode by transmitting a data stream, via a first keyboard controller output port, for detection by a PC or host to which the keyboard peripheral device may be connected. The keyboard controller responds to keyboard scan codes associated with the telephone control keys by transmitting signals, via a second keyboard controller output port, to a telephone controller which is also integral to the keyboard peripheral device. For instance, an activation signal produced by operating the telephone control keys directs the telephone controller to bridge the incoming telephone line to the telephone instrument. A de-activation signal notifies the telephone controller to drop the telephone line connection. Other signals received and processed by the telephone controller include, among others, codes used to generate DTMF tones for dialing a called party—these codes are transmitted from the numeric keyboard area when this area is operating in the telephone call mode. The telephone controller may also include isolation circuitry to separate the electrical voltage and current levels associated with a standard telephone call set-up from the low-level electronic levels used to operate the standard keyboard and the keyboard controller.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of our invention can be readily utilized as a computer keyboard peripheral device which combines keyboard and telephone functionalities by integrating both physical layout and electronic operation.

Figure 2:
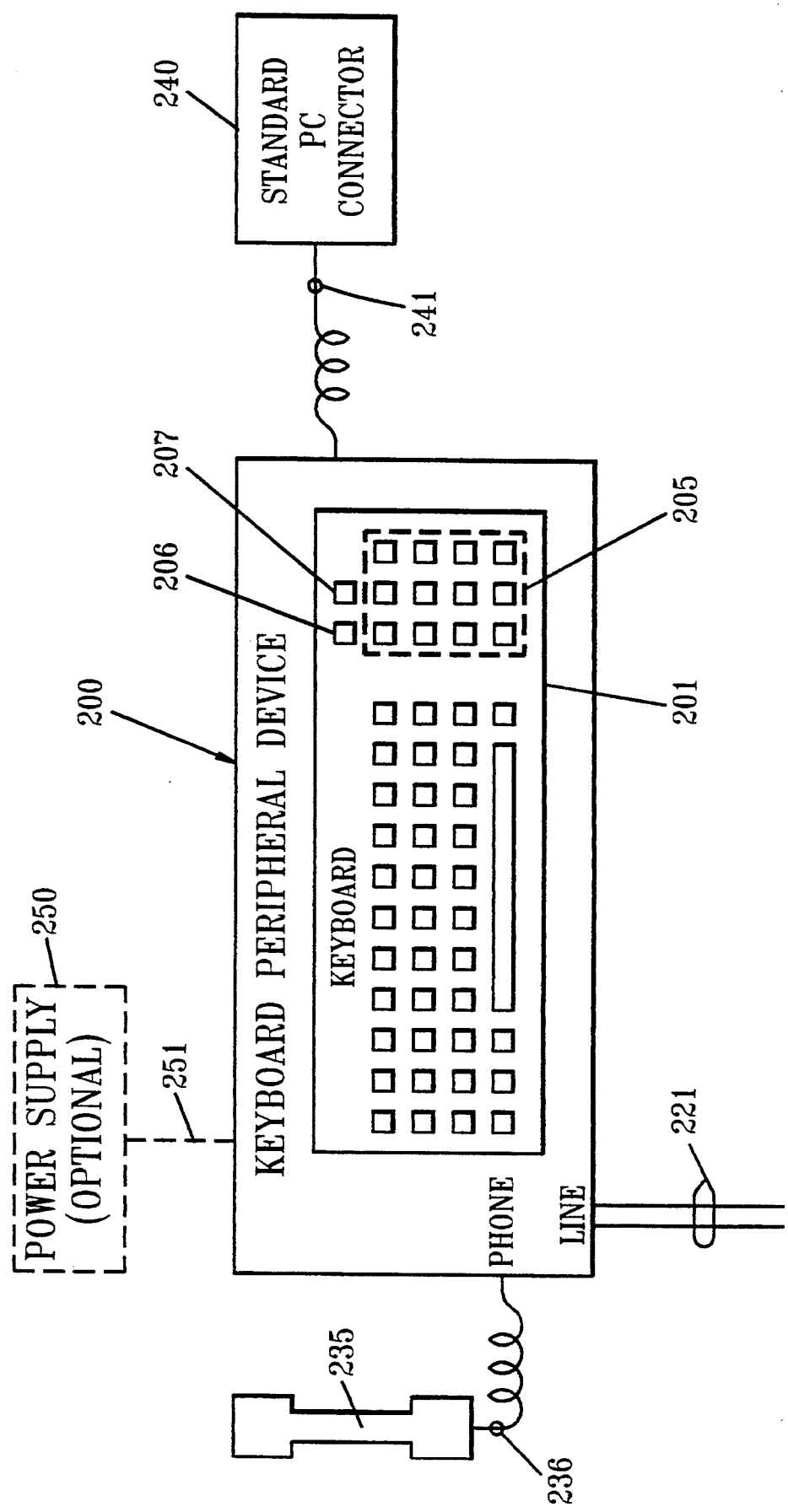
FIG. 2 depicts, partially in pictorial view and partly in electrical diagram form, the keyboard peripheral device in accordance with the present invention.

With reference to FIG. 2, keyboard peripheral device 200 in accordance with the present invention is shown partially in pictorial form and partly in electrical schematic form. In its electrical aspect, device 200 directly terminates telephone line 221 at the LINE port of device 200 as well as telephone instrument 235 at the PHONE port of device 200 via telephone cord 236 (although instrument 235 is shown pictorially as a telephone handset, instrument 235 may also be, for example, a telephone headset arrangement so the user may use both hands for keystroking). In addition, device 200 is arranged with a standard keyboard cable 241 having standard PC connector 240 at its free end; cable 241 is the electrical propagation medium to transmit electrical signals between device 200 and a PC (not shown in FIG. 2). Device 200 is composed of keyboard 201, which is essentially a standard keyboard mechanically and electronically augmented with two special keys, namely, DIAL key 206 and LINE key 207. If device 200 is to be used with, for example an IBM model PC/AT personal computer (PC) ("IBM" being a registered trademark of the International Business Machines Corporation of Armonk, New York), then keyboard 201 is a type that is operationally compatible with such a PC; for instance, keyboard part 201 may provide the IBM Enhanced 101 key layout. As elucidated in more detail below, keyboard 201 is encoded so that all keys produce a unique output code upon switch depression and a similar by unique code upon switch release. Communication with the host PC is effected in synchronous serial link fashion over standard PC keyboard cable 241.

A subset of keys on keyboard 201, shown as encompassed by dotted box 205, serves a dual function, as discussed in more detail shortly. Briefly, in the normal keyboard mode, that is, with LINE key 207 and DIAL key 206 not activated, the keys of box 205 serve their usual function. However, once keys 206 and 207 are activated, the keys of box 205 serve as a telephone DTMF keypad.

For completeness in discussing FIG. 2, there is shown optional power supply 250 connected to device 200 via power cord 251. Normally, device 200 is powered, as is a standard PC keyboard, from its associated PC via keyboard cable 241; however, device 200 may operate on a stand-alone basis so that it is still possible to establish and maintain a telephone call even though device 200 is completely disconnected from its associated PC (such as, for example, by removing PC connector 240 from the plug-in receptacle of the PC). This stand-alone capability reiterates the point that device 200 is truly autonomous.

Figure 1:
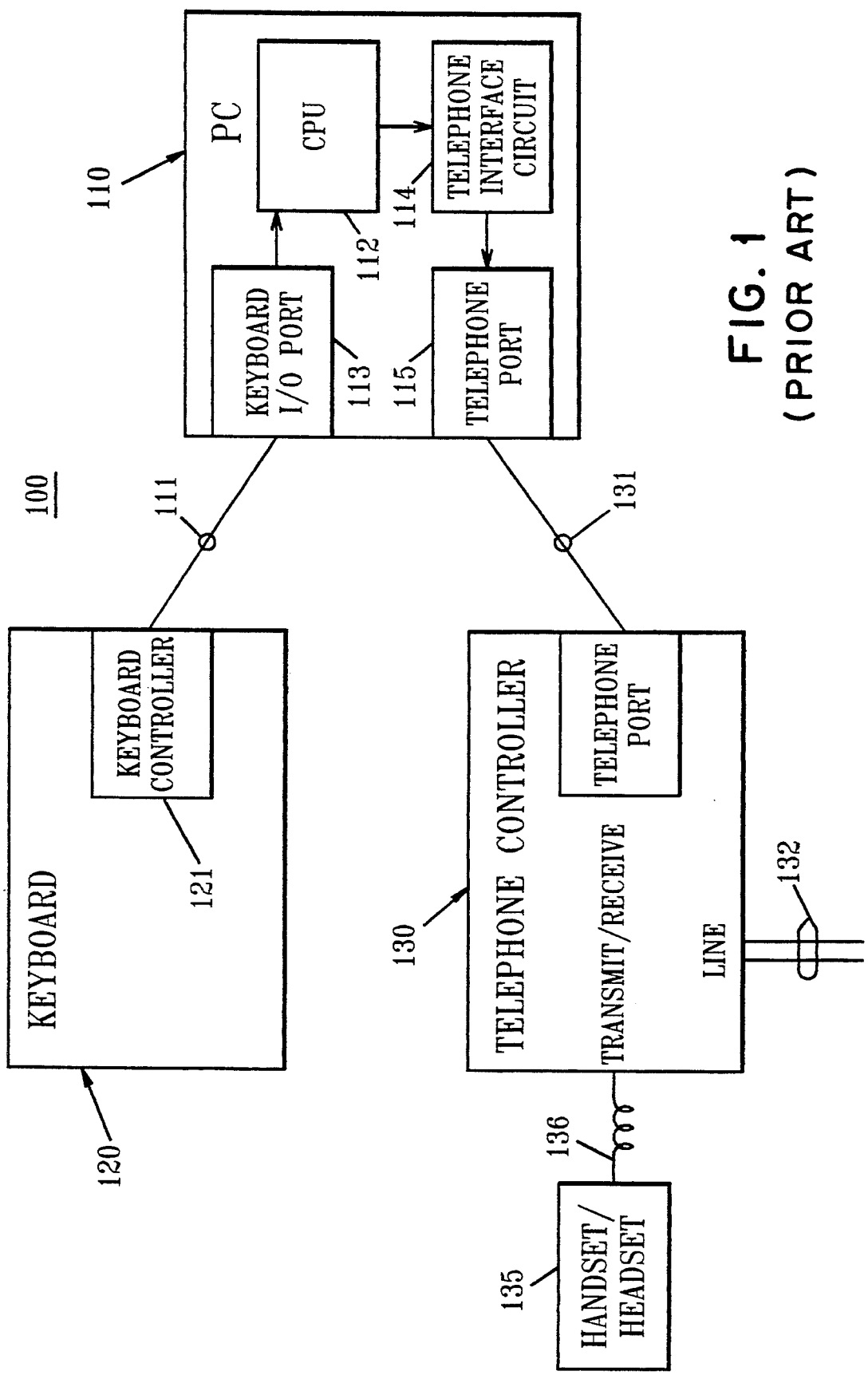
FIG. 1 depicts a high-level block diagram of circuitry representative of prior art related to the present inventive subject matter.
Figure 3:
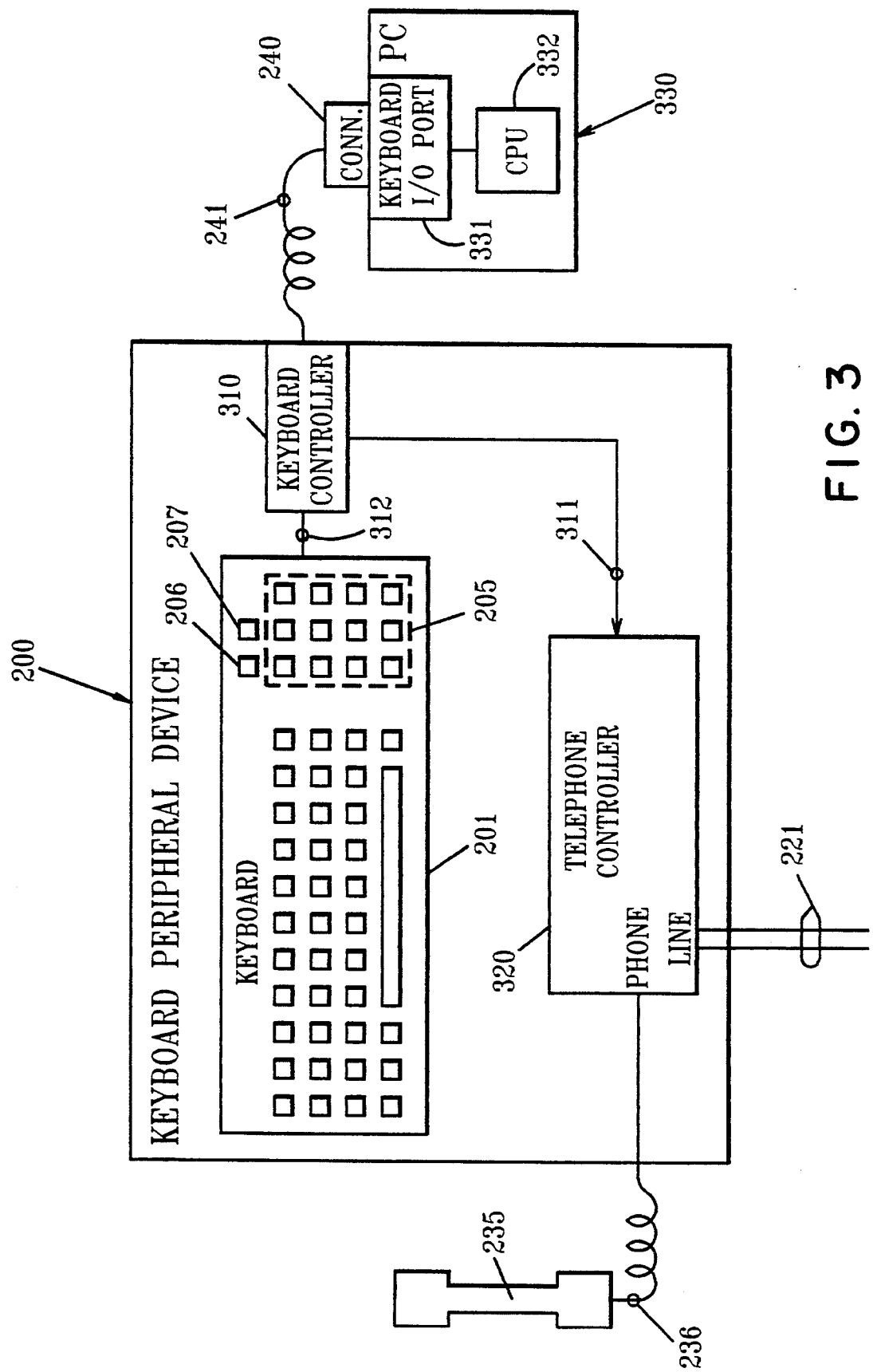
FIG. 3 depicts in more detail, but still partially in pictorial view and partly in electrical diagram form, the inventive keyboard peripheral device.

Now with reference to FIG. 3, device 200 is shown in somewhat more detail, but still partially in pictorial view and partly in electrical schematic form. The depiction of FIG. 3 is commensurate with the diagram of FIG. 1 so as to facilitate comparison of the two figures and to thereby clearly point out the aspects of the present inventive subject matter which distinguish it from the prior art. It is evident in FIG. 3 that both telephone line 221 and telephone instrument 235 are electrically dependent upon device 200 to effect any interconnection between line 221 and instrument 235; both telephone line 221 and instrument 235 terminate in a subcomponent of device 200, namely, telephone controller 320. Keyboard controller 310, which is normally interposed between keyboard 201 and PC 330, is in the arrangement of FIG. 3 also directly coupled to telephone controller 320 via bus 311. Keyboard controller 310 provides control information to telephone controller 320, such as "establish a telephone call set-up" or "dial a digit of a telephone number" as described in more detail below. Whereas PC 110 of FIG. 1 is configured with additional telephone circuitry in order to establish a telephone connection, PC 330 of FIG. 3 requires no electronic modifications or enhancements and is unaffected by and even decoupled from call set-up telephone controller 320 now embedded in device 200.

Figure 4:
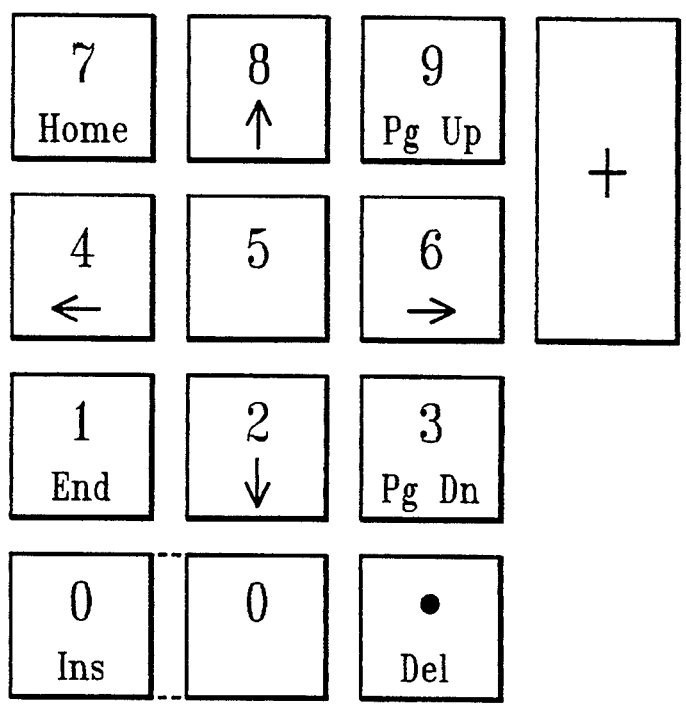
FIGS. 4 and 5 illustrate the dual use of an area of the keyboard peripheral device for the data entry and telephone modes, respectively, of the peripheral device.
Figure 5:
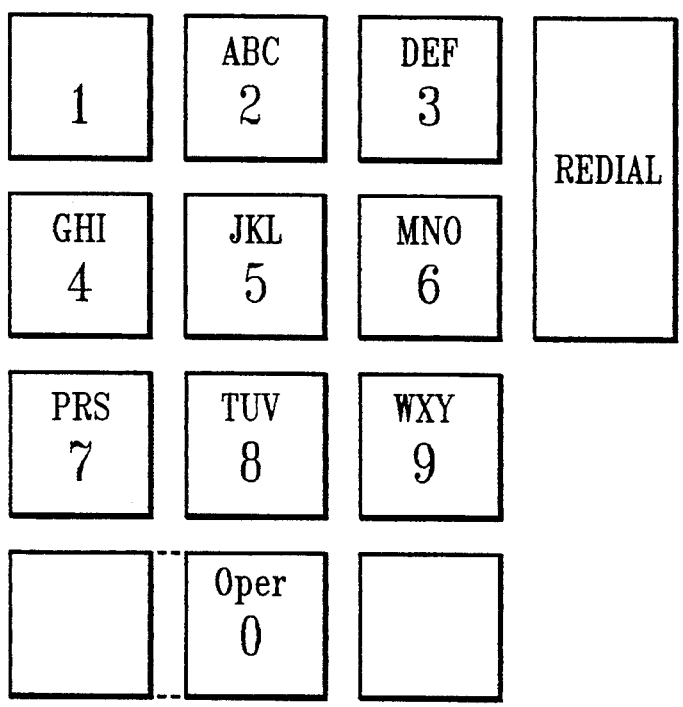

As alluded to earlier, keypad area 205 of keyboard 201 serves a dual purpose depending upon the states of DIAL key 206 and LINE key 207. In the first mode, referred to as the standard mode, wherein no telephone-related activity is required, the keys in keypad area 205 are interpreted as shown in FIG. 4, which is the common PC usage of this keypad area. In the second mode, referred to as the control mode, wherein keys 206 and 207 have been operated to indicate a telephone-related activity, the keys in keypad area 205 are interpreted as shown in FIG. 5, which is a layout substantially similar to the keypad layout on a DTMF telephone instrument.

Again with reference to FIG. 3, interpretation of user keystrokes on keyboard 201 is effected by keyboard controller 310, which is electrically coupled to keyboard 201 via keyboard bus 312. Keyboard 201 is encoded so that each key typically generates a unique output code upon key depression and a unique but similar output code upon key release; such codes are conventionally referred to as "scan codes." (Simultaneous activation of two or more keys is also possible on many keyboards, but processing of scan codes in this situation need not be discussed herein since the focus of the present inventive subject matter does not directly relate to situations of simultaneous key activations.) Keyboard controller 310, shown in FIG. 6 in high-level block diagram form, is generally composed of a cascade of scan code interpreter 213 and function generator 215. Scan code interpreter 213 receives its scan code input from keyboard 201 over keyboard bus 312. The output of scan code interpreter 213 is transmitted to generator 215 over bus 214. Generator 215 is arranged with two output ports, namely, serial port 216 and parallel port 217.

To succinctly describe the operation of the keyboard controller 310, the processing engendered by an exemplary single keystroke proves illustrative. If the keyboard user strikes the letter Z on an IBM PC/AT compatible keyboard, then scan code "1A" (in hexadecimal) is generated and transmitted over keyboard bus 312 to scan code interpreter 213. Scan code interpreter 213 performs, in essence, a table look-up on the incoming scan code to determine what function is to be performed as a result of the user striking this given key. For the letter Z keystroke, the function to be accomplished is simply the transmission of two bytes representative of the letter Z from serial port 216 of generator 215 to PC 330. Function generator 215 carries out the specific transmission by emitting, in the illustrative case of an IBM PC/AT, an 11-bit data word (start bit, two bytes representative of "1A" in hex, parity bit, and stop bit) using a conventional synchronous serial protocol over serial port 216. The data word is referred to as computer data herein.

Figure 6:
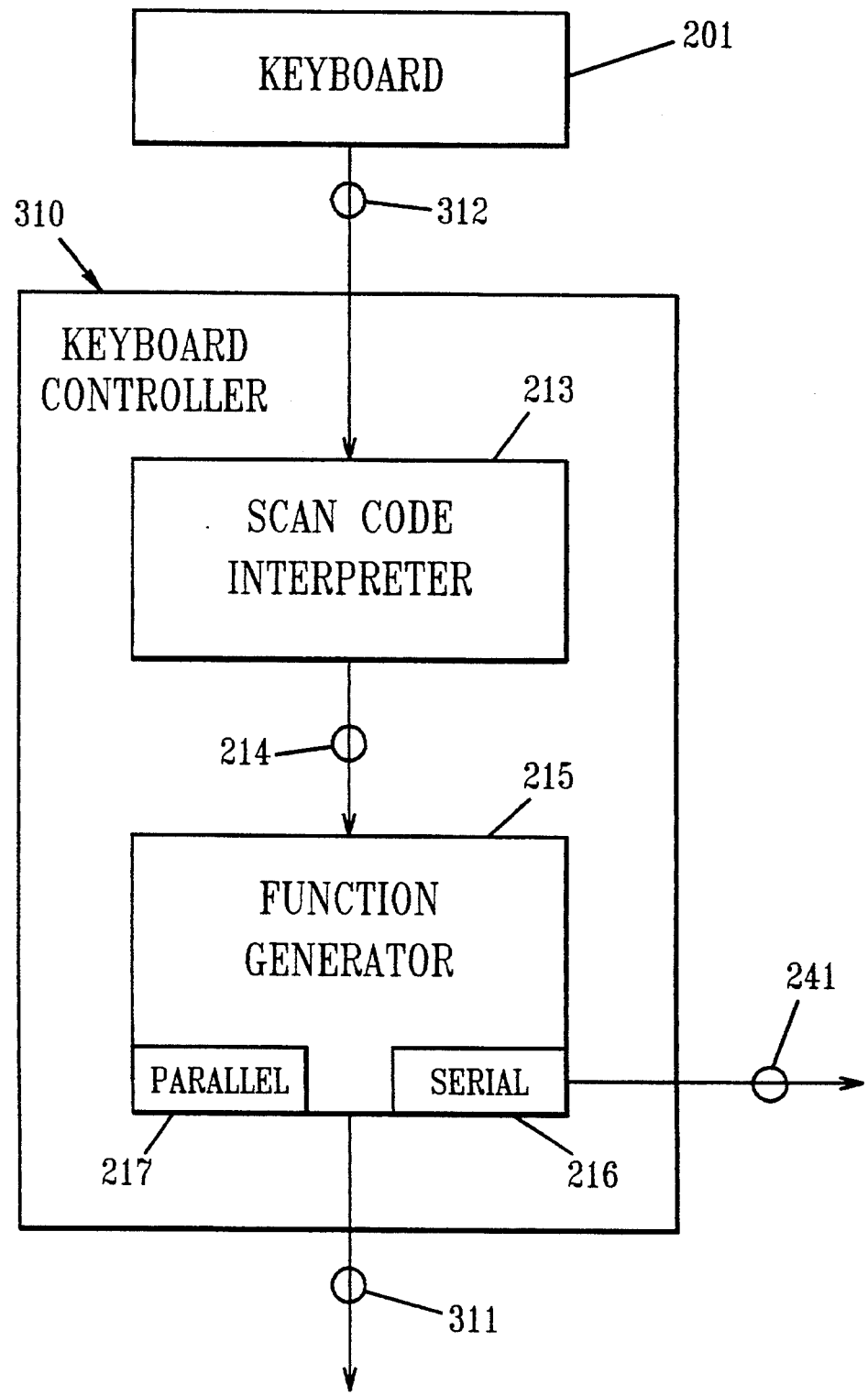
FIG. 6 depicts, in high level block diagram form, major subcomponents of the keyboard controller of FIG. 3.

To exemplify a scan code event that occurs during the alternative keyboard mode during, for example, the setting-up of a telephone call, it is presumed that LINE key 207, shown in FIG. 3, is placed into its "ON" position. Depressing LINE key 207 produces a scan code which causes function generator 215, shown in FIG. 6, to transmit eight bits (e.g., "DD" in hex) in parallel from parallel port 217 for a predetermined time interval; these eight bits are referred to as control data herein. The parallel bits are in turn, propagated over bus 311 to telephone controller 320, shown in FIGS. 3 and 7, where these bits are appropriately processed to effect an "off-hook" condition for instrument 235, as discussed in more detail below. It is especially important to note that parallel port 217 and serial port 216, shown in FIG. 6, are decoupled for this event so that PC 330 is unaware of the scan code processing occurring within keyboard device 200. This fact again reinforces the autonomous nature of device 200.

With the activation of LINE key 207, typically only keypad area 205 (see FIG. 3) is enabled, that is, all other keys are disabled. Keypad area 205 then has the interpretation as shown in FIG. 5. Illustratively, LINE key 207 is alternate action and codes only on the downstroke. The scan code generated in depressing the key to "OFF" from "ON" signifies that instrument 235, shown in FIG. 3, should be disconnected from telephone line 221 (i.e., go "on-hook"). Moreover, placing DIAL key 206 in its "ON" position causes scan codes having the interpretation as in FIG. 5 to be transmitted to telephone controller 320. In this way, once instrument 235 goes "off-hook" and draws dial tone, keypad area 205 may be used to dial the desired telephone number.

Keyboard controller 310 may be readily implemented with an off-the-shelf (commercially available) integrated circuit chip; an illustrative chip is device number 80C31 available from the Intel Corporation. This chip has a programmable ROM so the developer of the keyboard peripheral device may load functions to be generated by function generator 215 upon receipt of pre-specified scan codes provided by keyboard 201. Moreover, this device is appropriately configured with both a serial port and a parallel port as required of keyboard controller 310.

Figure 7:
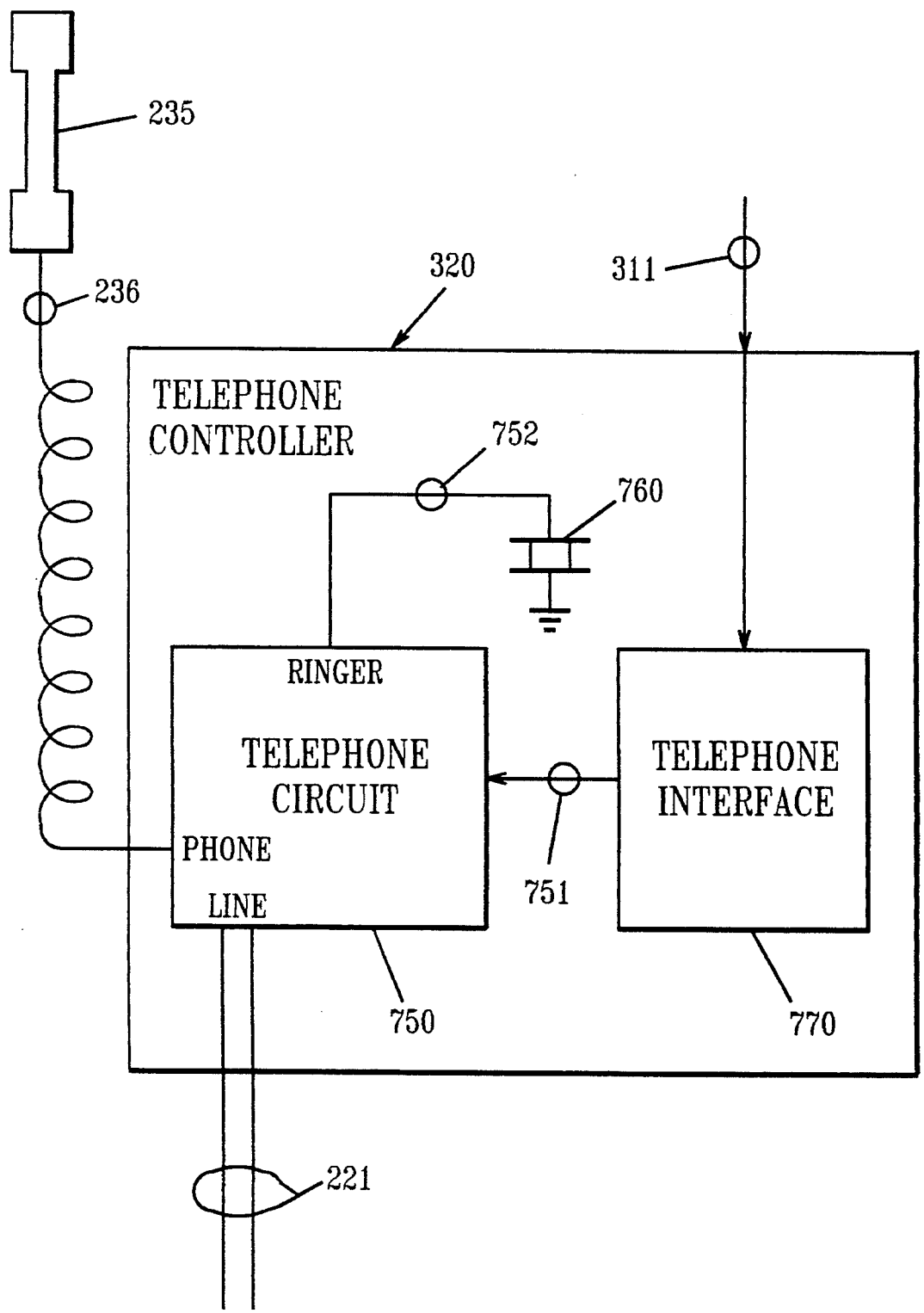
FIG. 7 depicts, in high level block diagram form, major subcomponents of the telephone controller of FIG. 3.
Figure 8:
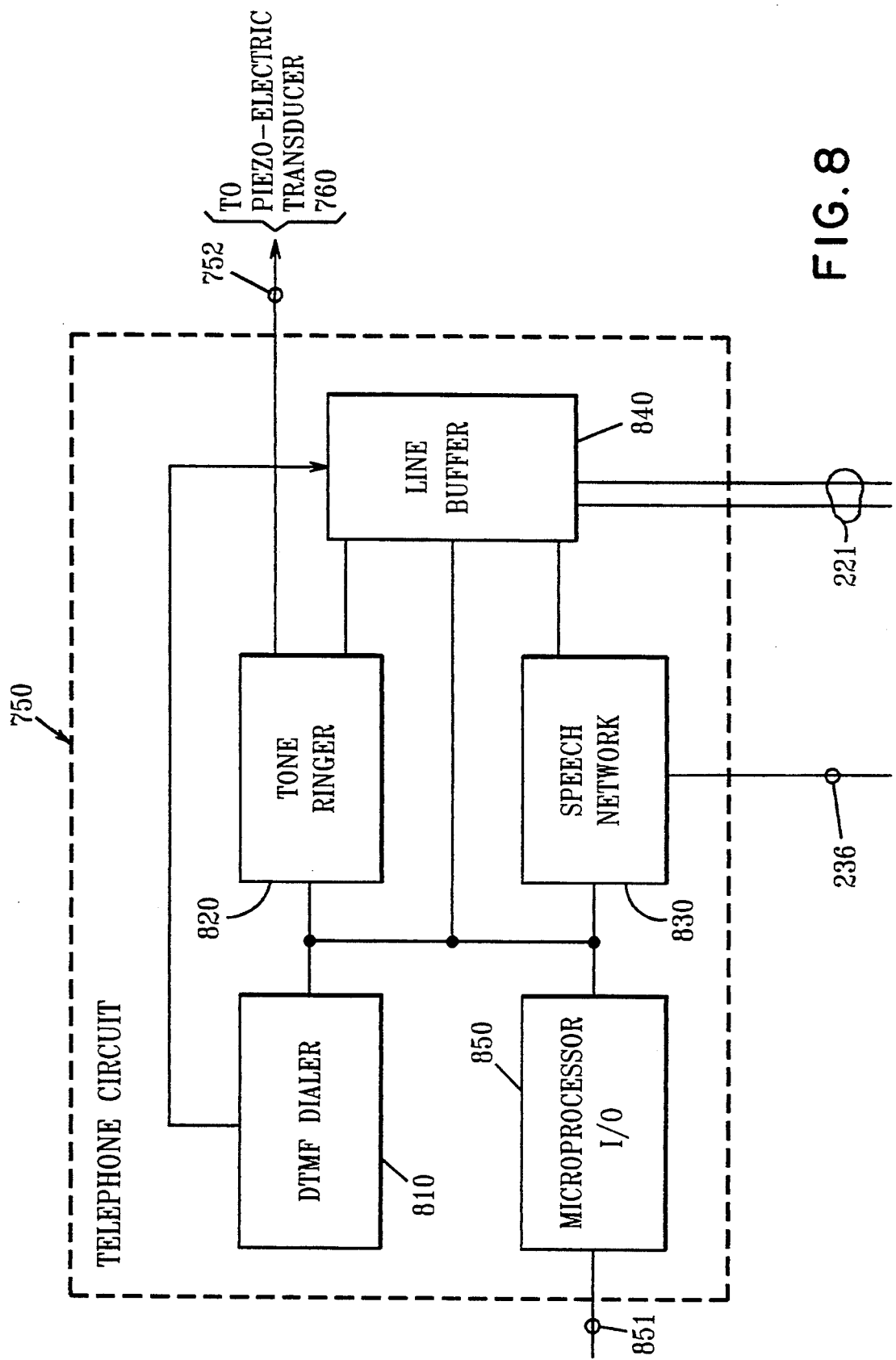
FIG. 8 illustrates a block diagram of an illustrative electronic telephone circuit set forth in FIG. 7.

Now with reference to FIG. 7, the major subcomponents of telephone controller 320 are shown in block diagram form. In particular, controller 320 is composed of telephone interface 770, telephone circuit 750 directly connected to interface 770 via bus 751 and piezoelectric transducer 7609 connected, via lead 752, to telephone circuit 750. Telephone circuit 750 directly terminates telephone line 221 and telephone instrument 235. In the preferred embodiment, telephone circuit 750 is realized with an off-the-shelf integrated circuit chip, namely, device number MC34010 available from the Motorola Corporation. The MC34010 provides all the basic telephone station apparatus functions in a single integrated circuit chip, as illustrated in FIG. 8. Such functions include DTMF dialer 810, tone ringer 820, speech network 830, line buffer 840, and on-board microprocessor 850; microprocessor 850 has an I/O port terminating the I/O bus 851 to facilitate automatic dialing features. In the presence of an appropriate AC ringing voltage on telephone line 221, tone ringer 820 generates a square wave derive voltage to piezo-electric transducer (sound element) 760, which in turn, produces an appropriate ringing sound. Consequently, telephone controller 320 rings just like a standard standalone telephone regardless of whether the inventive keyboard device 200 is connected to the PC or not. In that regard, provided device 200 is externally powered, viz. lead 251 (see FIG. 2), and connected to telephone line 221, but not to the PC, then, as alluded to earlier, this device will function just like a telephone—with the ability to send and receive telephone calls and ring, thus confirming the truly autonomous nature of device 200. Again, referring to FIG. 7, to expeditiously couple keyboard controller 310 with telephone circuit 750, telephone interface 770 is interposed between controller 310 and circuit 750; interface 770 is especially useful to match the operating characteristics of Intel chip 80C31 with Motorola chip MC34010.

The depiction of FIG. 8 is a high-level block diagram of device MC34010. This diagram is a rendition of the high-level block diagram set forth in the technical data description of the MC30410 to explain the detailed operation of the chip; it is included herein to describe the manner of interfacing Intel chip 80C31 to Motorola chip 34010. Of especial importance is the technique by which data transmitted from function generator 215 (see FIG. 6) provides its input to microprocessor 850 over bus 851 via telephone interface 770.

Figure 9:
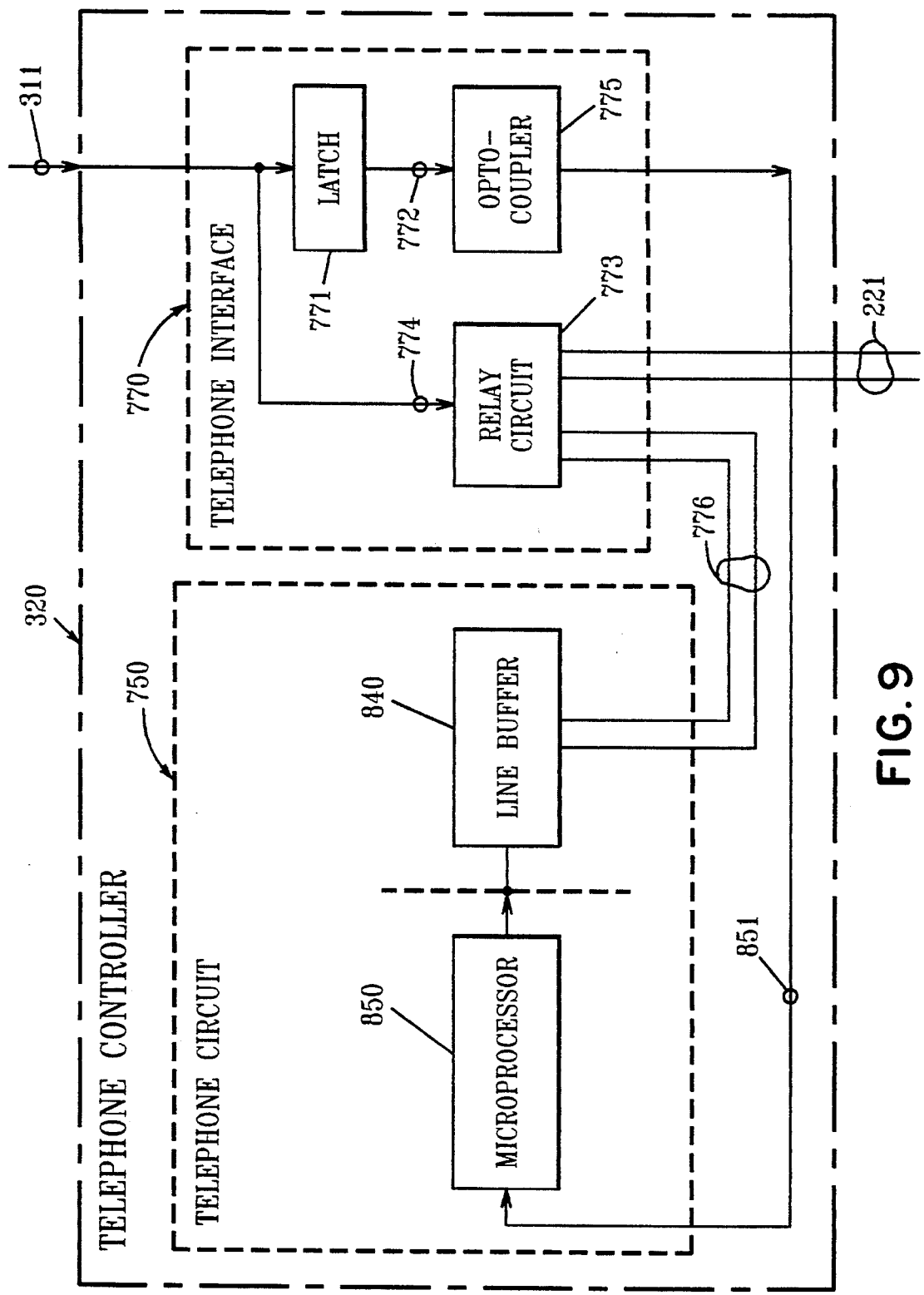
FIG. 9 illustrates an illustrative embodiment of the telephone interface of FIG. 7.

With reference to FIG. 9, telephone interface 770, in an illustrative embodiment, is composed of latch 771, optical coupler ("opto-coupler or "opto-isolator") 775, and relay circuit 773. Latch 771 receives its input from function generator 215 (FIG. 6) over bus 311. The purpose of latch 771 is primarily two-fold: first, the parallel output bits from function generator 215 are captured for a required time interval (these captured bits are referred to as "latched data" herein); and, second, the latched data bits are converted to a serial bit stream for transmission, over serial bus 772, to opto-coupler 775. Opto-coupler 775 decouples the electronic circuitry of keyboard controller 310 from telephone circuit 750 by passing electronic signals through electro-optical isolation devices; such devices may be implement with standard, off-the-shelf (commercially available) components well-known to those skilled in the art. The latched data at the input of opto-coupler 775 is first converted to optical signals; the optical signals are reconverted to electrical signals, called interface signals, appearing at the output of opto-coupler 775. These interface signals are used to further control microprocessor 850 via bus 851. Relay circuit 773, when energized by LINE key 207 (shown in FIG. 3) and via bus 311 (shown in FIG. 9), connects telephone line 221 to telephone circuit 750 and also serves to isolate the electrical voltage and current leads associated with the telephone circuit from the low-level electronic leads used to operate the keyboard controller. In particular, line buffer 770 of illustrative chip MC34010 is adapted so that an "on/off" switch hook of a common telephone may be wired to the MC30410 so as to complete the electrical connection of line 221 to the other circuits of the MC34010. Relay circuit 773 includes relay contacts (not shown) which serve the electrical equivalent of the switch hook, as well as providing electrical isolation between the telephone and keyboard circuitry.

Microprocessor 850 is designed to control serial I/O bus 851 which, in its input phase, receives telephone numbers for DTMF dialer 810. Such control may be exerted externally by asserting a specified input pin (e.g. "DD") to the MC34010. The loading of function generator 215 with the requisite functions to effect the desired operation of phone circuit 750 by providing suitable data to microprocessor 850 during phone mode operation may now be readily contemplated and appreciated by those with skill in the art.

Although a preferred embodiment which incorporates the teachings of the present invention has been shown and described in detail herein, those skilled in the art can readily devise many other varied embodiments that still incorporate these teachings. Accordingly, it is to be understood that the above-described embodiments are simply illustrative of the application of the principles in accordance with the present invention. Such embodiments which may be readily devised by those in the art may embody the principles in spirit, and such embodiments are limited only by the scope of the following claims.

We claim:

1. An autonomous computer peripheral device terminating a telephone line and separately terminating a telephone instrument, the device comprising a keyboard having a standard array of keys for interacting with the computer; said keyboard also including telephone control keys to switch said keyboard between a standard keyboard mode and a telephone control mode, said keyboard generating a unique keyboard scan code for each keystroke, and further said keyboard being arranged with a subset of said keys serving a dual function such that said subset of keys is interpreted as standard keyboard keys in said standard mode and as telephone keypad keys in said telephone mode;

a keyboard controller, coupled to said keyboard, said keyboard controller having a first output port and a second output port and wherein said keyboard controller interprets each said scan code generated by said each keystroke to propagate computer data through said first output port whenever said keyboard operates in said standard mode and to propagate control data through said second output port whenever said keyboard operates in said telephone mode, wherein for said subset of keys said computer data differs from said control data; and a telephone controller, coupled to the telephone line, the telephone instrument, and to said keyboard controller and responsive to said control data from said second output port, for controlling the interconnection of the telephone line and the telephone instrument in response to said control data.

2. The device as recited in claim 1 wherein said keyboard controller comprises:

a scan code interpreter, responsive to said keyboard, for receiving each said scan code and for producing a function to be carried out by said keyboard controller as determined by each said scan code; and a generator, coupled to said telephone controller and responsive to said function produced by said scan code interpreter, wherein said generator provides said first output port and said second output port and generates said computer data for said first output port and said control data for said second output port whenever said keyboard alternately operates in said standard keyboard mode and said telephone mode, respectively.

3. The device as recited in claim 2 wherein said first output port is arranged to propagate said computer data in a synchronous serial protocol, and said second output port is arranged to propagate said control data in a parallel protocol.

4. The device as recited in claim 1 wherein said telephone controller comprises:

a telephone interface, responsive to said keyboard controller, for receiving said control data and for converting said control data to interface signals; and a telephone circuit, coupled to the telephone line, the telephone instrument and said telephone interface and responsive to said interface signals, for controlling the interconnection of the telephone line and telephone instrument in response to said interface signals.

5. The device as recited in claim 4 wherein said telephone interface comprises electro-optical isolation circuitry, coupled to said keyboard controller and said telephone circuit, for converting said control data to optical signals and for reconverting said optical signals to electrical signals to produce said interface signals.

6. The device as recited in claim 4 wherein said telephone interface comprises:

a latch, coupled to said keyboard controller, for receiving said control data and for converting said control data to latched data;

an opto-coupler, coupled to said latch, for converting said latched data to optical signals and for reconverting said optical signals to said interface signals; and a relay circuit, having relay contacts interposed in the telephone line for alternately connecting or disconnecting the telephone line to said telephone circuit and for providing electrical isolation.

7. The device as recited in claim 6 wherein said telephone circuit comprises a line buffer, coupled to said relay circuit, for terminating said connected or said disconnected telephone line.

8. The device as recited in claim 1 further including means for connecting to an external power source.

9. The device as recited in claim 1 wherein:

said keyboard controller comprises a scan code interpreter, responsive to said keyboard, for receiving each said scan code and for producing a function to be carried out by said keyboard controller as determined by each said scan code; and a generator, coupled to said telephone controller and responsive to said function produced by said scan code interpreter, for providing said first output port and said second output port and for generating said computer data for said first output port or said control data for said second output port whenever said keyboard operates in said standard keyboard mode or said telephone mode, respectively; and said telephone controller comprises:
- a telephone interface, responsive to said keyboard controller, for receiving said control data and for converting said control data to interface signals; and
- a telephone circuit, coupled to the telephone line, the telephone instrument, and said telephone interface and responsive to said interface signals, for controlling the interconnection of the telephone line and telephone instrument in response to said interface signals.

10. The device as recited in claim 9 wherein said telephone interface comprises electro-opto isolation circuitry, coupled to said keyboard controller and said telephone circuit, for converting said control data to optical signals and for reconverting said optical signals to electrical signals to produce said interface signals.

11. The device as recited in claim 10 wherein said telephone interface comprises:
- a latch, coupled to said keyboard controller, for receiving said control data and for converting said control data to latched data;
- an opto-coupler, coupled to said latch, for converting said latched data to optical signals and for reconverting said optical signals to said interface signals; and
- a relay circuit, having relay contacts interposed in the telephone line for alternately connecting or disconnecting the telephone line to said telephone circuit.

12. The device as recited in claim 11 wherein said telephone circuit comprises a line buffer, coupled to said relay circuit, for terminating said connected or said disconnected telephone line.

13. The device as recited in claim 9 further including means for connecting to an external power source.

14. A computer peripheral device operated by a user, the device directly terminating a telephone line and directly terminating a telephone instrument, the device comprising:
- a keyboard for interacting with the computer and implemented such that each keystroke on said keyboard generates a unique scan code, said keyboard further including two special keys both physically and electronically integral to said keyboard, said keys including a first key to control interconnection of the telephone line to the telephone instrument, and a second key to enable pre-selected keys on said keyboard to serve as telephone dialing keys such that said pre-selected keys serve a dual function in that said pre-selected keys are interpreted as standard keyboard keys in a standard keyboard mode and as telephone keypad keys in a telephone dialing mode;
- a keyboard controller, coupled to said keyboard and the computer, for interpreting each said scan code produced by each said keystroke and for generating a function in correspondence to each said keystroke, wherein said first key produces a first control function and said second key produces a second control function; and
- a telephone controller, coupled to said keyboard controller and connected to the telephone line and the telephone instrument, for interconnecting the telephone line to the telephone instrument in response to said first control function and for dialing over the telephone line in response to said second control function.

15. The device as recited in claim 14 wherein said first key controls a third control function activated by the user to disconnect the interconnected telephone line and the telephone instrument.

16. The device as recited in claim 14 wherein said keyboard controller comprises:
- a scan code interpreter, responsive to said keyboard, for receiving each said scan code and for producing said first control function in response to said first key and said second control function in response to said second key; and
- a generator, coupled to said telephone controller, for executing said first control function and said second control function when invoked by the user by the operation of said first key and said second key, respectively.

17. The device as recited in claim 16 wherein said telephone controller comprises:
- a telephone interface, responsive to said keyboard controller, for receiving said first control function and for converting said first control function to interface signals; and
- a telephone circuit, coupled to the telephone line, the telephone instrument and said telephone interface and responsive to said interface signals, for controlling the interconnection of the telephone line and the telephone instrument in response to said interface signals.

18. The device as recited in claim 17 wherein said telephone interface also receives said second control function and converts said second control function to dialing signals, and said telephone interface controls the dialing of the telephone line in response to said dialing signals.

* * * * *